(12) United States Patent
Long

(10) Patent No.: US 6,787,036 B2
(45) Date of Patent: Sep. 7, 2004

(54) METHOD AND APPARATUS FOR AERATING WASTEWATER

(75) Inventor: David G. Long, LeRoy, NY (US)

(73) Assignee: FBC Technologies, Inc., Leroy, NY (US)

( * ) Notice: Subject to any disclaimer, the term of this patent is extended or adjusted under 35 U.S.C. 154(b) by 34 days.

(21) Appl. No.: 10/347,882

(22) Filed: Jan. 21, 2003

(65) Prior Publication Data

US 2004/0140262 A1 Jul. 22, 2004

(51) Int. Cl.[7] .................................................. C02F 3/08
(52) U.S. Cl. ......................... 210/629; 210/219; 261/84
(58) Field of Search ................................ 210/620, 629, 210/630, 219; 261/84, 91

(56) References Cited

U.S. PATENT DOCUMENTS 2,590,431 A * 3/1952 Rose ........................... 210/128
4,192,740 A * 3/1980 Savard et al. ............... 210/614

FOREIGN PATENT DOCUMENTS

JP              53073668 A  *  6/1978  .................. 210/219

* cited by examiner

Primary Examiner—Robert A. Hopkins
(74) Attorney, Agent, or Firm—Stephen B. Salai, Esq.; Roger Aceto, Esq.; Harter, Secrest & Emery LLP

(57) ABSTRACT

Oxygen depleted wastewater is introduced as a stream into the top of a vessel containing a set of perforated triangular vanes arranged to rotate about a vertical axis. The stream is directed downwardly in the vessel along a path that traverses the path of the rotating vanes so the vanes impact the stream. The force of the impact of the vanes against the stream and the perforations in the vanes cooperate to create a fine droplet mist in the vessel. Atmospheric air drawn into the vessel is mixed and entrained in the mist so that when the mist coalesces, micro-fine size air bubbles are formed. The triangular vanes further provide a pumping action to expel a now aerated stream of wastewater from adjacent the bottom of the vessel.

20 Claims, 1 Drawing Sheet

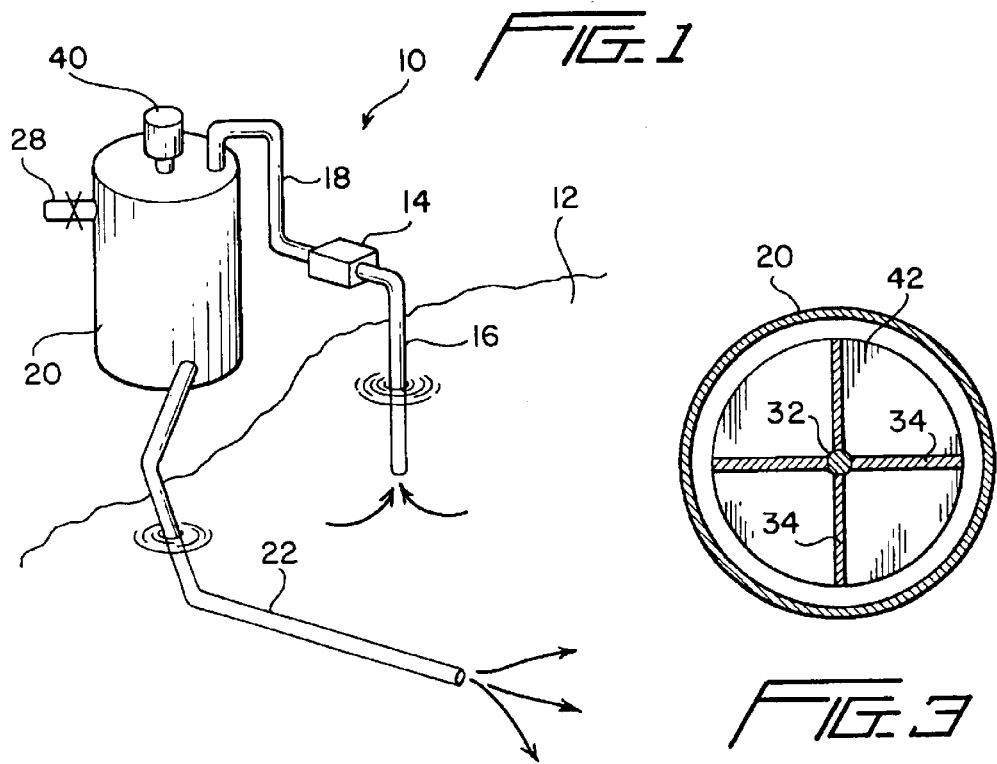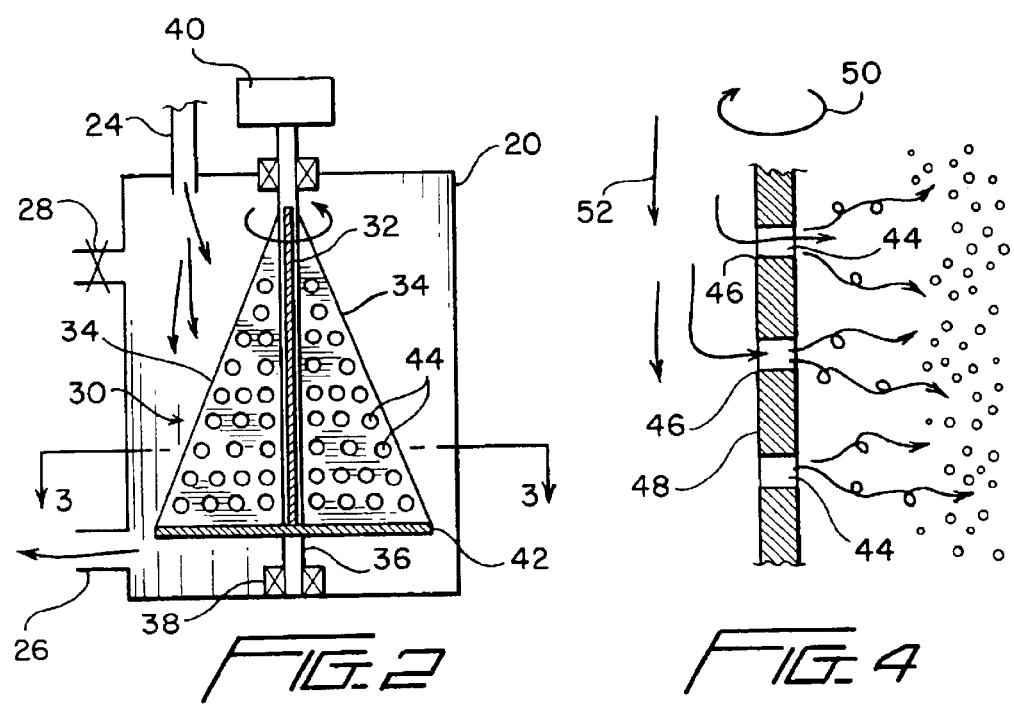

METHOD AND APPARATUS FOR AERATING WASTEWATER

BACKGROUND OF THE INVENTION

1. Field of the Invention

The present invention relates generally to the treatment of wastewater and more particularly to increasing the level of oxygen in oxygen depleted wastewater to facilitate the aerobic treatment of wastewater in a lagoon.

2. Description of Related Art

It is well known that certain kinds of waste can be treated by relatively long-term exposure of bacteria in lagoons. Typically, the treatment of waste in lagoons is both aerobic and anaerobic, that is the treatment is by bacteria that require oxygen as well as bacteria that do not require oxygen to break down organic material in the lagoons. The byproducts of anaerobic bacteria include hydrogen sulfide and the like, which have an unpleasant odor and make the lagoons bad neighbors. Aerobic bacteria produce carbon dioxide as a byproduct and therefore can be situated in populated areas without creating noxious odors.

In many instances, waste created by food processing plants and the like has such a low oxygen content that only anaerobic bacteria activity can be supported in the waste. It has become common to attempt elevating the level of oxygen mixed in the waste by a variety of methods. In one method an aerator is floated on the surface of the lagoon. This floating or "surface" aerator is in effect an agitator that causes a violent splashing of the water wherein water at or just below the surface of the lagoon is ejected into the air. All of the splashing and ejection of the water increases the exposure of the water to air and aids in increasing the oxygen content of the water which enhances the ability of the water to support aerobic activity.

A drawback of surface aerators is that they are relatively inefficient in terms of the amount of oxygen introduced into the wastewater per unit of energy consumed. In this respect a large amount of energy is required to drive the impellers of a surface aerator through the water and the introduction of oxygen is limited to the upper reaches of the wastewater lagoon. Accordingly, the cost for obtaining even a modest increase in oxygen content in the immediate area of the surface aerator is relatively high. Also, the enhanced oxygen effects are transient in that the oxygen concentration in the wastewater returns to the non-aerated level almost immediately when surface aeration stops. The aerobic activity quickly ceases as anaerobic activity with its associated problems resumes.

In another apparatus and method, air is introduced towards the bottom of the lagoon from a bubble pipe. The pipe generally is a horizontal pipe having a plurality of drilled holes. Air pumped into the pipe escapes through the holes and rises in streams of bubbles to the surface. The rising streams of bubbles act to increase the oxygen content in the immediate area. For enhanced efficiency, the bubble pipe can be supported for movement across the bottom of the lagoon to increase the volume of wastewater exposed to the bubbles. While bubble aeration is effective to some extent, it suffers the same defect as surface aeration in that the effects of enhanced oxygenation are transient. The relatively large bubbles quickly rise to the surface and an elevated oxygen level quickly falls as soon as the pumping of air to the bubble pipe stops.

The amount of oxygen in wastewater is conventionally measured in milligrams per liter. The wastewater produced by food processing plants may have no more than a few 10ths of a milligrams/liter of oxygen at the time it is introduced into a treatment lagoon. The aerators just described may increase the oxygen concentration in the water to 5 or 6 milligrams/liter in the areas directly affected by the aerators but the increase is very localized and is maintained only as long as the aerators are actually running.

Aerators of the type described are inefficient in terms of the amount of oxygen introduced into the wastewater per unit of energy consumed. For example, it is not unusual for even a moderate sized treatment facility to use $100,000 or more of electricity per year to power the surface aerators necessary to produce even a modest increase in aerobic bacterial activity. In both types of aeration systems, the event of a power failure will cause the oxygen concentration of the water to return to the non-aerated level almost immediately and aerobic activity quickly ceases as anaerobic activity with its associated problems resumes.

In a more recent innovation, a centrifuge has been used to introduce larger amounts of air into the wastewater. In this case the untreated wastewater is pumped to a centrifuge. Water introduced into the center of the centrifuge is hurled outward by centrifugal force to impinge on a wall of the centrifuge. This breaks the water stream into small droplets and increases the surface area to enhance the uptake of air into the wastewater stream by decreasing bubble diameter. By significantly reducing the size of the bubbles formed in the wastewater to a micro-fine size (less than 15 microns), the amount of oxygen absorbed into the water at the bubble interfaces increases. The residence time of the bubbles in the wastewater also increases, as the smaller bubbles are slower to rise to the surface.

The oxygen-enriched stream then is the fed back into the lagoon where the oxygen enhanced stream mixes with the untreated wastewater. While this method has advantages over oxygen enriching systems of the prior art, a still further improved and more efficient system is desired.

Accordingly, it is an object of the present invention to provide an improved method and apparatus for elevating the oxygen content of wastewater.

Another object is to provide a method and apparatus for aerating wastewater that allows the wastewater to retain an elevated oxygen content for a substantial time after aeration stops.

A further object is to provide a method and apparatus for aerating wastewater by creating a mist composed of water droplets thoroughly mixed with atmospheric air, coalescing the droplets to entrap the air in a treated stream and introducing the treated aerated stream into a wastewater lagoon.

BRIEF SUMMARY OF THE INVENTION

In the present invention, an aeration method and apparatus is provided that increases the oxygen content of wastewater to levels that remain relatively high over time after aeration stops. This renders the oxygen content less transient so that short interruptions in the operation of the apparatus can be tolerated without adversely effecting the ability to support aerobic treatment of the wastewater.

Briefly stated and in accordance with the method of the present invention, a stream of the untreated wastewater is drawn from a treatment lagoon. The stream is aerated to increase its oxygen content and then is discharged back into the lagoon. Aeration is conducted in a manner such that the oxygen content of the water remains elevated for a substantial time after discharge.

The oxygen content of the wastewater is increased by introducing a stream of the wastewater into a vessel containing a rapidly spinning rotor comprising a plurality of vanes. Preferably the vessel is land based although it may be placed on a float in the lagoon. The stream entering the vessel is directed in a path parallel to the axis of rotation of the rotor and into the path of the rotor vanes. The rotor is driven at speeds sufficient to cause the vanes to impinge against the stream with enough force to cause the stream to disintegrate into a mist of water droplets. A slight negative pressure is created in the vessel as the surface area of the stream expands so atmospheric air is drawn into the vessel and entrained in the water droplets. As the droplets coalesce and reform after impacting the vanes, micro-fine bubbles of air are formed and entrapped. In this fashion the wastewater stream in the vessel is aerated.

A stream of the wastewater, now aerated, is discharged from the vessel by the pumping action of the rotor and is directed back into the lagoon. In the lagoon, the aerated stream dissipates to enhance the oxygen content of the wastewater in the lagoon.

It has been noted that the oxygen content of wastewater treated in this manner remains elevated for a significant time after the treatment stops. This is attributed in part to the micro-fine size of the oxygen carrying bubbles created by impinging the vanes of the rotor against the wastewater stream. These small bubbles not only increase the volume of air in the water but also remain in the water for an extended period so the wastewater can absorb a significant amount of oxygen.

It is preferred that the vanes be perforated. These perforations expose the impinging wastewater stream to a greater number of edge surfaces, which is believed to facilitate shearing the stream and dramatically increasing the amount of oxygen introduced into the wastewater.

Accordingly, the present invention may be characterized in one aspect thereof by a method of aerating wastewater to enhance aerobic treatment comprising:

a) introducing a stream of oxygen depleted wastewater from a lagoon into an upper level of a treatment vessel and directing the stream downwardly in the vessel and into the path of perforated vanes rotating about a vertical axis in the vessel;

b) impinging the vanes at a right angle against the downwardly flowing wastewater stream with sufficient force to temporarily divide at least part of the wastewater stream into a fine droplet mist, the dividing of the wastewater stream into the fine droplet mist and resulting surface area expansion creating a negative pressure within the vessel;

c) drawing atmospheric air in to the vessel in response to the negative pressure, the air drawn into the vessel intimately mixing with the fine droplet mist and becoming entrained in the mist and forming relatively small bubbles as droplets in the mist coalesce thereby facilitating the dissolving of atmospheric oxygen into the wastewater and enhancing the oxygen content of the wastewater;

d) expelling the now oxygen enhanced treated wastewater from an outlet at a lower level of the vessel under the influence of a pumping action produced by the rotating vanes; and e) returning the oxygen enhanced wastewater back to the lagoon.

In another aspect, the present invention may be characterized by an apparatus for aerating wastewater comprising:

a) a vessel having an oxygen depleted wastewater inlet at an upper level and an oxygen enhanced wastewater outlet at a lower level;

b) a vaned rotor within the vessel and arranged for rotation about a vertical axis, each of the vanes having a plurality of openings therethrough;

c) means for rotating the rotor;

d) the inlet being arranged to direct an oxygen depleted wastewater stream downwardly into the vessel along a path generally parallel to the rotor axis of rotation so that the vanes impinge against the oxygen depleted wastewater stream at a generally right angle thereby dividing the stream into a fine droplet mist and creating a negative pressure in the vessel;

e) a valved inlet for admitting atmospheric air into the vessel in response to the negative internal pressure, the air mixing with the fine droplet mist thereby enhancing the oxygen content of the wastewater stream; and f) the rotating vaned rotor providing a pumping means to expel the now oxygen enhanced wastewater stream from the enhanced wastewater outlet at a lower level of the vessel.

DESCRIPTION OF THE DRAWING(S)

FIG. 1 is a schematic view showing an aeration system of the present invention in place at a wastewater treatment lagoon;

FIG. 2 is a vertical elevation view partly broken away and in section showing the aeration apparatus of the present invention;

FIG. 3 is sectional view taken along lines 3—3 of FIG. 2; and

FIG. 4 is a view on an enlarged scale showing a cross section of portion of the apparatus of FIG. 2.

DETAILED DESCRIPTION OF THE INVENTION

Referring to the drawings, FIG. 1 shows an aeration system generally indicated at 10 incorporating the apparatus of the present invention. The system preferably is land based and is located adjacent a lagoon 12 containing a body of oxygen depleted wastewater to be treated. While it is preferred that the system be land based for ease of maintenance, it also can be located on a float stationed in the lagoon.

The aeration system 10 includes a pump 14 having an inlet pipe 16 extending into the lagoon. The pump has its outlet 18 connected to a treatment vessel 20. Wastewater from the lagoon is pumped into the vessel, treated by aeration and then is pumped back in to the lagoon thorough a distribution pipe 22.

As best seen in FIG. 2, the treatment vessel 20 is a closed, generally cylindrical vessel having an inlet 24 at an upper level of the vessel and an outlet 26 at a lower level. The inlet and out let are connected to the pump outlet 18 and distributor pipe 22 respectively. A valved air inlet 28 allows for the controlled entry of air into the vessel.

A vaned rotor 30 is disposed within the vessel. The rotor is arranged for rotation about a vertical axis and comprises a shaft 32 and a plurality of vertically oriented vanes 34 that are fixed to the shaft and extend outward from the shaft. Preferably, the vanes are four in number and are equally spaced about the shaft. The shaft has a lower end 36 fitted in a bearing 38 at the bottom of the vessel. The upper end of the shaft extends through the top of the vessel and is coupled to a drive motor 40. Preferably the vessel is air tight except for the valved air inlet 28.

Each of the vanes 34 is generally triangular wherein the base of each vane is located adjacent a lower end of the vessel. For purposes of stability, the bottom edge of each vane is welded to a circular plate 42 that stabilizes the vanes (FIGS. 2 and 3). As shown in FIGS. 2 and 4, each of the vanes is provided with a plurality of circular openings 44. Each of the openings defines a relatively sharp circular edge 46 on the surface 48 of the vane facing in the direction of the rotation of the rotor as indicated by arrow 50.

In operation, the motor 40 is operated to rotate the vanes 34 at a relatively high RMP. A preferred speed is in the range of 1400 to 2000 RPM or higher. The pump 14 is operated to pump untreated wastewater from the lagoon 12 and into the vessel inlet 24. The stream of untreated wastewater is generally vertical and initially flows generally parallel to the axis of the rotor shaft 32 as seen in FIG. 2 so the vertically oriented vanes spinning about a vertical axis impact the stream at substantially a right angle. This is best seen in FIG. 3 wherein arrows 52 indicate the direction of flow of the wastewater stream and the direction of the vane is indicated by arrow 50.

The result is a violent collision of the stream and the surface 48 of each rotating vane that blasts the stream into small droplets. The openings 44 perform several functions in this operation. For example, the holes decrease the surface area of the vanes impacting against the stream so that less force is required to drive the rotor through the stream. Also, the sharp edges 46 provided by the circular openings 44 facilitate in the division of the stream into small droplets. In this respect each of the plurality of sharp edges 46 provides an edge that acts to shear the stream. Moreover, wastewater passing through the openings is thought to expand so that it is dissipated over a larger surface area of a following vane where the shearing action is repeated to further divide the wastewater stream. In any event, the impact is believed to be so violent that the inter-molecular structure of the water is sufficiently broken to bring it close to the vapor state where the molecules are highly excited and many may have been struck apart from each other.

By blasting the wastewater stream into small droplets, the surface area of the water in the stream is rapidly expanded and creates a negative pressure in the vessel so air is drawn into the vessel through the valved air inlet 28. Adjusting the valved inlet 28 controls the amount of air entering the vessel. The air drawn into the vessel intimately mixes with the water droplets as the droplets coalesce. The pumping action of the rapidly rotating vanes then force waters from the vessel through outlet 26.

The high surface area created by dividing the stream into fine droplets allows the rapid absorption of atmospheric oxygen into the water. Also, as the droplets coalesce, micro-fine size air bubbles are formed that become entrained in the wastewater as the water is pumped from the vessel. It can be demonstrated that these small size bubbles take a relatively long time to dissipate so the oxygen content of the treated wastewater remains relatively high over time and even after aeration stops.

The now aerated and oxygen enhanced stream of wastewater pumped from the vessel is returned to the lagoon through the discharge pipe 22. As the aerated stream enters the lagoon, the treated wastewater dissipates throughout the lagoon. The atmospheric oxygen intimately mixed with the water in the vessel and then reintroduced into the lagoon is held in the water for an extended period. This can be demonstrated by the increased retention of elevated oxygen levels in the treated wastewater over time that is available to support aerobic activity.

As noted above, the vanes 34 are rotated so that they are directed against the passing stream of wastewater. Since the vanes 34 are not immersed in the wastewater (as is generally the case with a surface aerator) the energy requirements for driving the rotor through the stream are less than for a surface aerator.

In one embodiment, the vessel comprises a stainless steel barrel about three feet (91.4 cm) in diameter and three feet high. The four vanes of the rotor likewise are stainless steel wherein vanes extending from opposite sides of the rotor shaft form essentially an equilateral triangle having a base extending almost the fall width of the vessel. The triangular shape is preferred because this shape presents less stress on the welds that hold the vanes to the rotating assembly including shaft 32 and plate 42. Triangular vanes also offer less wind resistance and fatigue loading as compared to rectangular blades. The vanes are perforated with a series of 35 drilled holes about 0.75 inches (19.05) mm) in diameter. The holes are equally spaced over the surface of the vanes and the distribution pattern of the holes is the same for each vane. With the rotor turning at about 1,400 to 1,850 RPM, wastewater is introduced into the vessel at a rate of about 250 gallons/min (946 liters/min). The introduction preferably is in two equal streams, one to either side of the rotational axis of the rotor and both being directed generally parallel to the rotor shaft. With this arrangement the vanes of the rotor impact the streams at diametrically opposite ends of the vane rotational path with the impact of each vane against the streams being generally at a right angle.

The impact of the vanes against the streams and subsequent expansion of the surface area of the wastewater lowers the pressure within the vessel so that atmospheric air is drawn into the vessel and is mixed with the wastewater. As a result, the dissolved oxygen content of wastewater that is at a low level of 0.14 mg/L prior to treatment is increased to about 10.4 mg/L after treatment. These are the values of the dissolved oxygen content of the streams entering and leaving the treatment vessel at the 250 gal/min rate. A sample of the treated water, after standing for about thirty minutes has a dissolved oxygen content of 9.2 mg/L demonstrating that the elevated oxygen levels are maintained for an extended period of time.

In another test of the apparatus, ambient temperature tap water is directed against the vanes of a perforated rotor operating at a speed of close to 2000 RPM. The discharge from the vessel is collected in a five gallon pail and the dissolved oxygen content of the pail is measured over time. At discharge, a dissolved oxygen content of 14 mg/L remained at relatively high 10 mg/L after standing for five minutes. After ten minutes the oxygen content decreased to only 9 mg/L and to 7 mg/L after thirty minutes.

Accordingly, it should be appreciated that the present invention provides an improved method and apparatus for aerating wastewater that significantly elevates the oxygen content. Increases in dissolved oxygen content of 10 mg/L or more are common even when starting with wastewater that is substantially completely depleted of dissolved oxygen. Moreover, the introduction of oxygen is conducted in a manner that allows wastewater to retain an elevated oxygen content for a substantial time after aeration stops. The impacting of a wastewater stream against the perforated vanes of a rapidly spinning rotor according to the present invention brings the stream to a near vapor allowing the formation of micro-fine size bubbles and the incorporation of a significant amount of atmospheric oxygen into the wastewater.

What is claimed is:

1. A method of aerating wastewater to enhance aerobic treatment comprising:

a) introducing a wastewater stream into an upper level of a vessel and down into the path of vertically oriented perforated vanes arranged to rotate in the vessel about a vertical axis;

b) rotating the vanes and impinging the vanes at a right angle against the waste water stream with sufficient force to temporarily divide at least part of the wastewater stream into a fine droplet mist, the dividing of the waste water stream into the fine droplet mist and resulting surface area expansion creating a negative pressure within the vessel;

c) drawing atmospheric air in to the vessel in response to the negative pressure, the air drawn into the vessel intimately mixing with fine droplet mist and becoming entrained in the mist and forming relatively small bubbles as droplets in the mist coalesce thereby facilitating the dissolving of atmospheric oxygen into the wastewater and enhancing the oxygen content of the wastewater; and d) expelling the now oxygen enhanced wastewater from a lower level of the vessel under the influence of a pumping action produced by the rotating vanes.

2. A method as in claim 1 comprising pumping untreated wastewater from a lagoon for introducing into the vessel and returning the now oxygen enhanced wastewater back into the lagoon.

3. A method as in claim 1 wherein impinging the vanes against the wastewater stream entrains micro-fine bubbles of atmospheric air in the wastewater stream expelled from the vessel.

4. A method as in claim 1 comprising increasing the dissolved oxygen content of the wastewater to at least 10 mg/L.

5. A method as in claim 1 comprising rotating the vanes at speeds of 1400–2000 RPM.

6. A method as in claim 1 wherein the vanes are generally triangular and arranging the vanes with the base of the triangle adjacent the lower level of the vessel.

7. A method as in claim 6 comprising arranging four vanes equally spaced about a vertically oriented drive shaft.

8. A method as in claim 1 comprising rendering the vessel substantially air tight and drawing atmospheric air into the vessel through a valved inlet in response to the negative pressure in the vessel.

9. A method as in claim 1 comprising introducing two wastewater streams into the vessel at spaced apart locations, each of the streams impacting the vanes at diametrically opposite ends of the rotational path of the vanes.

10. A method of aerating wastewater to enhance aerobic treatment comprising:

a) introducing a stream of oxygen depleted wastewater from a lagoon into an upper level of a treatment vessel and directing the stream downwardly in the vessel and into the path of vertically oriented perforated vanes rotating about a vertical axis in the vessel;

b) impinging the rotating vanes at a right angle against the downwardly flowing wastewater stream with sufficient force to temporarily divide at least part of the wastewater stream into a fine droplet mist, the dividing of the waste water stream into the fine droplet mist and resulting surface area expansion creating a negative pressure within the vessel;

c) drawing atmospheric air in to the vessel in response to the negative pressure, the air drawn into the vessel intimately mixing with the fine droplet mist and becoming entrained in the mist and forming entrapped microfine bubbles as wastewater droplets in the mist coalesce thereby facilitating the dissolving of atmospheric oxygen into the wastewater and elevating the dissolved oxygen content to at least 10 mg/L thereby enhancing the oxygen content of the wastewater; and d) expelling the now oxygen enhanced treated wastewater from an outlet at a lower level of the vessel under the influence of a pumping action produced by the rotating vanes; and returning the oxygen enhanced wastewater back to the lagoon.

11. Apparatus for aerating wastewater comprising:

a) a vessel having an oxygen depleted wastewater inlet at an upper level and an oxygen enhanced wastewater outlet at a lower level;

b) a rotor within the vessel including a shaft arranged for rotation about a vertical axis and a plurality of vertically oriented vanes extending outwardly from the shaft, each of the vanes having a plurality of openings therethrough;

c) means for rotating the rotor;

d) the wastewater inlet being arranged to direct an oxygen depleted wastewater stream downwardly into the vessel along a path generally parallel to the rotor axis of rotation so that the vanes impinge against the oxygen depleted wastewater stream at a generally right angle, the impingement dividing the stream into a fine droplet mist and creating a negative pressure in the vessel;

e) a valved inlet for admitting atmospheric air into the vessel in response to the negative pressure, the air mixing with the fine droplet mist in the vessel thereby enhancing the oxygen content of the wastewater stream; and f) pumping means for expelling the now oxygen enhanced wastewater stream from the oxygen enhanced wastewater outlet at a lower level of the vessel.

12. Apparatus as in claim 11 wherein each of the vanes is triangular, the base of each triangular vane being oriented adjacent the lower level of the vessel.

13. Apparatus as in claim 12 wherein the base of each vane is connected by a stabilizing flat plate.

14. Apparatus as in claim 11 wherein the pumping means is provided by the vaned rotor.

15. Apparatus as in claim 11 wherein the openings through each vane are equally spaced over the surface of the vanes and the distribution pattern of the openings is the same for each vane.

16. Apparatus as in claim 11 wherein the openings are circular.

17. Apparatus as in claim 11 wherein the openings define sharp edges at the surface of each vane for shearing through the stream of wastewater as the vanes impinge against the steam.

18. Apparatus as in claim 11 including a pair of the wastewater inlets, one arranged to either side of the vertical axis of the rotor.

19. Apparatus as in claim 11 including a motor for driving the rotor at speeds of 1400 to 2000 RPM.

20. Apparatus as in claim 11 wherein the wastewater inlet and the oxygen enhanced wastewater outlet both communicate with a lagoon of oxygen depleted wastewater.

* * * * *